United States Patent [19]

Lakshmanan et al.

[11] Patent Number: 5,728,754
[45] Date of Patent: Mar. 17, 1998

[54] CABLE FILLING AND FLOODING COMPOUNDS

[75] Inventors: P. R. Lakshmanan, Houston; Amir Tayebianpour, League City, both of Tex.

[73] Assignee: The International Group, Inc., Wayne, Pa.

[21] Appl. No.: 675,390

[22] Filed: Jul. 2, 1996

Related U.S. Application Data

[63] Continuation of Ser. No. 465,537, Jun. 5, 1995, abandoned.

[51] Int. Cl.$^6$ .................... C08L 23/16; C08K 5/01
[52] U.S. Cl. ............... 523/173; 524/487; 524/505; 524/579; 524/585; 525/88
[58] Field of Search .................. 523/173; 524/487, 524/505, 579, 585; 525/88

[56] References Cited

U.S. PATENT DOCUMENTS

| | | | |
|---|---|---|---|
| 4,105,619 | 8/1978 | Kaufman et al. | 523/173 |
| 4,701,016 | 10/1987 | Gartside, III et al. | 523/173 |
| 4,757,100 | 7/1988 | Wichelhaus et al. | 523/173 |
| 4,795,767 | 1/1989 | Turczyk et al. | 524/487 |
| 4,912,148 | 3/1990 | Kim et al. | 524/487 |

FOREIGN PATENT DOCUMENTS

| | | | |
|---|---|---|---|
| 258178 | 7/1963 | Australia | 524/487 |
| 2021612 | 12/1979 | United Kingdom | 523/173 |
| 2021612 A | 12/1979 | United Kingdom | 523/173 |

*Primary Examiner*—Andrew E. C. Merriam
*Attorney, Agent, or Firm*—Vinson & Elkins, L.L.P.

[57] ABSTRACT

Cable filling and flooding compositions are disclosed in which a carrier component such as process oil, mineral oil, synthetic oil, liquid polybutene or petrolatum is modified by the inclusion of high density polyethylene byproduct wax, a homo or partially crystalline copolymer of ethylene and, optionally, amorphous polypropylene and block copolymer to provide finished compositions with the application temperature viscosities, slump and other characteristics desirable for cable fill and flood applications.

5 Claims, No Drawings

CABLE FILLING AND FLOODING COMPOUNDS

This application is a continuation of application Ser. No. 08/465,537 filed Jun. 5, 1995, now abandoned.

FIELD OF THE INVENTION

This invention relates to wax modification and wax modified compositions useful in the preparation of desired compositions to serve as fillers and floods for cables, especially telecommunication cables.

BACKGROUND OF THE INVENTION

Telecommunication cables, particularly those which are buried underground, are constructed with waterproofing compositions applied both to the core of the cable and between the multi-layers of core wrap and the outer jacket to protect the insulated wire bundles from water encroachment and damage. The composition applied to the cable core is referred to as a cable filler, while the composition applied between the core wrap and outer protective casing or housing is referred to as a cable flood. The function of both the filling and flooding compositions is to provide protection to the insulated wires in the cable core from water which could seep in as a result of accidental damage to the outer casing of the cable.

Although both the cable filling and flooding compositions offer water barrier and water protection to the cable interior, the physical properties and the compositional makeup of the respective agents can be and usually are different. The composition intended to function as a cable filler should have a low viscosity at its application temperature and, preferably, be of a viscosity lower than the cable flooding agent. This is on account of the requirement that the composition fill the crevices of the insulated wire bundles of the cable and encapsulate that structure, which is accomplished if the applied composition is of very thin consistency during application. The cable flooding composition usually is of somewhat higher viscosity than the cable filling composition at application temperatures and can be applied at a higher temperature than the cable filling composition. Typically the cable filling composition has an application temperature range of about 230° F.–270° F. (110° C.–132.2° C.), while the cable flooding product is applied at between 260° F.–300° F. (126.6° C.–148.9° C.). Despite their low viscosities and high fluidity at their respective application temperatures, both exhibit semisolid to solid consistencies at room temperatures upon cooling to result in compositions having a soft to firm "feel."

In addition to the desirable viscosities, both cable waterproofing compositions must also exhibit adequate resistance to flow at an elevated temperature of around 80° C. Under this condition both the filling and flooding compounds must exhibit no flow or dripping from the interior of the cable construction. Otherwise the materials might flow or become dislodged after manufacture of the cable. Other associated property requirements of the cable fills and floods are they also must exhibit requisite oxidative stability and required electrical properties, such as proper resistivity and dielectrics.

The various prior art discloses many compositions and varying formulations for use as cable filling or flooding compounds. For example, in U.S. Pat. No. 3,717,716, Biskeborn et al. disclose a cable filler composition utilizing about 85% petroleum jelly, with the remainder consisting of a 0.915 density polyethylene having a molecular weight of about 135,000. The inventors also suggest that high molecular weight polypropylene or polybutene polymers (polybutylene) could be employed in place of the mentioned polyethylene.

In U.S. Pat. No. 3,775,548, Zinser et al. describe filling compounds employing a modified petroleum jelly base along with a polymer modifier such as polyisobutylene and a polyethylene in the molecular weight range of 3,000 to 400,000 with or without the inclusion of a polybutene polymer.

In U.S. Pat. No. 4,105,619, Kaufman et al. disclose petrolatum based compositions including a mixture of polybutene polymer and ethylene-propylene rubber, along with a relatively low molecular weight (i.e., in the 3500–4500 range) polyethylene. The disclosed compositions have claimed utility as cable flooding and cable filling compounds. The claimed improvement of the Kaufman et al. compositions over the prior art is their superior flow resistance at elevated temperatures in the temperature range of 160° F.–170° F. (71° C.–76.6° C.).

Other cable filling and flooding compositions disclosed in the prior art include mineral oil extended with block copolymers such as styrene-isoprene-styrene or styrene-ethylene/butene-styrene triblock copolymers and polyethylene. In U.S. Pat. No. 3,879,575, Dobbin discloses compositions utilizing a low or high molecular weight polyethylene with a number average molecular weight ("Mn") of about 1,000–15,000, mineral oil and a block copolymer. The disclosed composition is said to resist flow at temperatures of between 140° F.–150° F. (60° C.–65.5° C.).

U.S. Pat. No. 4,176,240 employs a mineral oil based recipe along with a saturated mid-block copolymer such as styrene-ethylene/butene-styrene copolymer and a polyethylene having a 110° C.–130° C. softening point and a 400–450 cps viscosity at 140° C., to result in a gelled composition with resistance to flow in the vicinity of 70° C. A claimed advantage is the easy cleanup property of the gel, which is said to not smear on hands during cable splicing and handling.

Other mineral oil based recipes have been disclosed by Bourland in his two U.S. Pat. Nos. 4,361,507 and 4,361,508, again utilizing a styrene-ethylene/butyene-styrene block copolymer along with a propylene homo or copolymer. They have claimed utility as cable filling composition.

Cable flooding compositions employing mixtures of 92%–94% microwax, 3%–5% polyethylene and 2%–4% of an ethylene-propylene rubber are disclosed by Hindman in U.S. Pat. No. 4,716,191. His composition is claimed to be a suitable replacement for atactic polypropylene, a commercially proven cable flooding product.

In the presented invention, is disclosed the utilization of certain low molecular weight waxy products, obtainable as byproducts. These byproducts, upon polymer modification, function as property modifiers in the preparation of cable filling or cable flooding compounds. The byproduct wax can be 'in situ' modified with appropriate polymers in a liquid medium to provide the desired ultimate telecommunication cable waterproofing compositions, or the wax can be modified initially with the polymer of choice to provide a modified wax composition for later blending with other components to arrive at the desired finished product.

This invention encompasses several objectives. One objective is to find a commercial use for a class of waxes generated during the polymerization and conversion of ethylene to high density polyethylene via the hydrocarbon diluent slurry process, employing Ziegler or modified Ziegler Catalyst. Polymerization of ethylene, via certain commercial slurry processes to produce high molecular weight high density polyethylene employing a liquid medium, such as hexane or heptane, can also produce inadvertent lower molecular weight species as an unwanted byproduct. Such byproduct has waxy characteristics (hard, brittle, low tensile strength, low viscosity, etc.). If left with the main product, the low molecular weight wax or wax-like product could compromise the general physical property of the high molecular weight polymer primary product which is the primary intent of the polyolefin production. Consequently, such low or lower molecular weight wax fraction is removed from the main product during the separation of the solvent from the high molecular weight polymer. In subsequent processing steps, the wax is separated from the hydrocarbon solvent, before the latter is recycled back to the primary system.

Hitherto, the byproduct wax, often referred to as "HDPE wax," has been disposed of by various means, including landfill or incineration. One reason as to why the byproduct wax is disposed of in that manner, rather than used for other purposes, is the variability in the molecular weight and other physical properties of the produced byproduct wax. The low molecular weight byproduct wax is hard and brittle, exhibiting a number average molecular weight, Mn, above 400 and usually in the 500–3,000 range. However, it is not unusual for the molecular weight of the recovered wax to have a higher molecular weight (Mn) of up to about 6,000, due to plant upsets, changes in the characteristics of the prime product, process conditions, etc. The density of the described byproduct wax is usually in the 0.92–0.96 g/cc range, but typically in the 0.93–0.96 range, influenced by the characteristics and composition of the main product produced at the time of the recovery of the byproduct was and by whether or not another comonomer has been utilized in the preparation of the high molecular weight high density polyethylene polymer.

The byproduct wax disclosed is distinguished from other somewhat similar commercial products, in that the latter type compositions are highly tailored low molecular weight products with a well-defined set of physical properties with a high degree of uniformity and consistency, because of their tight manufacturing conditions.

The utilization of byproduct HDPE waxes for commercial use is of particular interest and challenge because of their variability, due to the multitude of primary polymer products from which these are co-produced as unwanted byproducts. Variations in plant operating conditions also can affect the HDPE wax properties.

Another object of the present invention is to define an application for the beneficial commercial use of HDPE byproduct waxes and thereby avoid their unnecessary disposal via landfill or incineration or via other non-beneficial means.

A further object of the present invention is to disclose novel uses for such waxes following the polymer modification of such byproduct waxes to facilitate their commercial usage in telecommunication cable compounds. Due to the variability of the byproduct HDPE wax generated during the production of high molecular weight high density polyethylene, modification of the variable HDPE wax to achieve a uniform and consistent performance product is important for their ready and acceptable utilization in applications such as telecommunication cable compounds.

SUMMARY OF THE INVENTION

The cable fill and flood compositions of the present invention comprise an admixture of a first component comprising HDPE wax, in an amount of from about 45 weight percent to about 98 weight percent, a homo or partially crystalline copolymer of ethylene in an amount from about 2% to about 50%, and amorphous polypropylene in an amount of from 0 to about 50 weight percent, all based upon the total weight of first component and a second component selected from the group consisting of process oil, mineral oil, synthetic oil, liquid polybutene and petrolatum. The final composition preferably is from about 7 to 25 weight percent first component and from about 93 to 75 weight percent second component. Alternatively, the indicated ingredients may be mixed or added together, without preformulation into first and second components, to provide the final compositions.

DETAILED DISCLOSURE

The term "HDPE wax" as used in this detailed disclosure and in the claims refers to a wax-like substance produced as a byproduct in the manufacture of high density polyethylene and having an average molecular weight, Mn, of from about 200 to about 6,000, a density of from about 0.92 to about 0.96 g/cc and with a melt viscosity of from about 5 to about 1,000 cps at 300° F. More preferably, the HDPE wax has an average molecular weight, Mn, of from about 500 to about 3,000, a density of from about 0.93 to 0.95 g/cc and a viscosity of from about 5 cps to about 500 cps at 300° F.

A modifying polymer is used in conjunction with the HDPE wax and is selected from the group consisting of homopolymers and partially crystalline copolymers of ethylene and an alphaolefin and homopolymers and copolymers of amorphous polypropylene. The modifying polymer preferably has a density in the range of 0.88 to 0.93 g/cc and an average molecular weight, Mn, of from about 10,000 to about 100,000. The amount of modifying polymer used in combination with the HDPE wax is in the range of from about 2% to about 50% by weight, and more preferably in the range of from about 2% to 30% by weight, based upon the combined weight of the HDPE wax and the modifying polymer.

In producing cable filling and flooding compositions, the HDPE wax and modifying polymer are blended with a major portion of a liquid or soft, semisolid, carrier medium selected from the group consisting of mineral oil, process oil, polymerized alphaolefins, low molecular weight liquid polybutenes, low molecular weight low density polyethylene and petrolatum. The carrier medium has an average molecular weight, Mn, above about 200 and preferably in the range of from about 300 to about 3,000, a viscosity at 38° C. in the range of from about 30 cps to about 1,000,000 cps and a density at 25° C. of from about 0.8 to about 0.91 g/cc. The completed cable flood or fill composition comprises from about 7% to about 25%, and more preferably from about 10% to about 20% by weight of the first (wax/modifying polymer) component with the balance being the second (carrier medium) component. In preparing cable fill compositions, the preferred composition is from about 7% to about 20% first (wax/polymer) component and from about 88% to about 75% weight percent second (carrier) component, and about 4% to 10% or more of a component comprising a block copolymer such as styrene-ethylene/butene-styrene or styrene-ethylene propylene. The preferred carriers for cable fill compositions are mineral oil, synthetic oil, low molecular weight liquid polybutene or a combination thereof. Cable flood compositions preferably comprise from about 7% to about 25% weight percent of the first (wax/polymer) component and from about 93% to about 25% weight percent of the second (carrier) component. Preferred carrier components for cable flood compositions are liquid polybutene, synthetic oil, petrolatum and admixtures thereof.

Various adjuvants may be added to the main composition of the invention to improve certain properties and features of composition. These can be other waxes (e.g., petroleum derived, amorphous polypropylene and derivatives including their copolymer, elastomers and/or rubbers, gellants such as fumed silica, bentonites, mineral extender, etc.). Other additives which can be present in the total composition are antioxidants or antioxidant mixtures. These are usually of the primary hindered phenol type including various derivatives of phenols, used either solely or in combination with phosphite or thioesters. The antioxidants are present as radical scavengers to inhibit oxidative and/or thermal degradation during the preparation of the product or application or long term use. The antioxidant(s) or their combination is usually present at a level of 1% or below by weight, based upon weight of the total composition.

The method of preparation of the cable flood and fill compositions claimed herein is not critical and any suitable method may be employed. A preferred method of formulation, used in the examples discussed below is as follows:

PREPARATION OF CABLE FLOODING COMPOUND

Cable Flood Method A - Part I

In this method a polymer modified wax composition was first prepared (first component) which was later let down in the requisite quantity of the carrier medium (second component).

In a 400 ml glass beaker equipped with a motor-driven agitator, thermometer, a source of nitrogen inlet for blanketing the vessel content and a heating mantle, all properly anchored, was placed 225 g of HDPE wax. The wax was then melted via supply of heat with heating mantle. Upon melting 0.6 g of a 1:3 mixture of the antioxidant combination consisting of Wingstay SN-1 and Wingstay L-1 was added to the molten was under slow agitation. Heating was continued and the temperature of the mass was allowed to rise and held between 280° F. and 300° F. At this point the low density polyethylene or the chosen ethylene copolymers, 75 g was added in small amounts to the hot wax with continued stirring and dissolution until the entire amount of polymer was added. Throughout the polymer addition and subsequent processing, the temperature was held between 280° F. and 300° F. About 45 minutes to 1 hour was sufficient to obtain homogeneity in the mixture. Complete dissolution of the polymer in the wax as judged by melt uniformity and clarity was an indicator of the homogenization of the two components. At the completion of the preparation, the mixture was poured into a suitable container and stored.

Cable Flood Method A - Part II

In this procedure, the prepared modified wax mixture was converted to a cable flooding composition in the following manner.

The mixing vessel and set up was essentially similar to the approach used in the preparation of the modified wax composition, excepting for the specific ingredients used.

In a 400 ml glass beaker equipped with thermometer, a motor-driven agitator, nitrogen inlet and a heating mantle, all properly anchored, was placed a weighed quantity of liquid polybutene dictated by the recipe used to make a sufficient quantity of the final composition, e.g., 300 g.

To the liquid polybutene was then added 0.2% of an antioxidant mixture comprising 1:3 Wingstay SN-1 and Wingstay L-1 and the contents of vessel gradually heated to 280° F. When the mass became fluid, agitation was commenced and at the desired processing temperature, i.e., 280° F.–300° F., the previously prepared wax-polymer mixture in a state of small crushed pieces and of a weighed amount was added in small quantity. Dissolution of the wax composition in the hot liquid polybutene was quick, and upon completion of addition of the entire modified wax component, the entire mass was stirred to obtain complete homogeneity. About 45 minutes to 1 hour was sufficient to obtain complete dissolution and for the preparation of a typical batch. At the completion of the preparation, the mass was poured into a suitable container for later use.

Cable Flood Method B

This method is a variant of Method A-Part I and Part II combined, wherein the preparation of the ultimate cable flood composition was accomplished in a single step.

The set up, approach and technique were identical to the earlier described procedure. In terms of specificity, a weight quantity of liquid polybutene to make sufficient amount of the final product, i.e., 300 g was heated along with 0.2% of the antioxidant mixture to a temperature range of 280° F.–300° F. Under stirring at this point weighed amounts of the wax and the polymer were introduced in small quantities in a successive manner of wax first, followed by the polymer next. Upon complete dissolution of the wax, the polymer was added next while under agitation until the dissolution of the polymer was complete. The entire mass was mixed to homogeneity at the indicated temperature. About 45 minutes to 1 hour was adequate to prepare the described laboratory batch once the polybutene was brought up to the right mix temperature.

At the completion of the preparation, the mixture was poured into suitable container for later use.

This method, which is suitable for preparation of cable fill and flood compositions, was used to prepare the compositions of the examples shown in Tables I and II.

Cable Fill Method C - Part I

In Method C, the modified wax mixture was prepared first for later processing to a finished cable fill composition.

The procedure, technique, mixing conditions were identical to the step followed in Method A. Any variation employed was with respect to the recipe utilized in terms of wax and polymer and their respective levels.

Cable Fill Method C - Part II

This step was again identical to the approach used in Method A-Part II, the only difference being in the ingredients used.

Here a mineral oil was used as the carrier medium, into which a styrene-ethylene/butene-styrene block copolymer or styrene-ethylene/propylene-styrene block copolymer in enough quantity to conform to the prescribed recipe was dissolved, again with requisite amount of antioxidant present and at temperature of 280° F.–300° F. Upon the dissolution of the block copolymer, the previously prepared (Method C-Part I) wax composition in sufficient quantity was dissolved to homogeneity in the solvated mixture of block copolymer and mineral oil. The entire mass was stirred to homogeneity at the indicated elevated temperature, which took about one hour. At the end of the preparation, the mixture was poured into a suitable container for later use.

Cable Fill Method D

This procedure was identical to Method B wherein the cable filling composition was prepared directly in one step.

The set-up, technique and processing conditions were similar to what was described before.

Via this method, the requisite quantity of mineral oil, along with a 0.2% weight percent, based on the final amount of the mixture (300 g) of antioxidant was heated to the desired temperature at which point a quantity of the block copolymer called for in the recipe was added to the hot medium under stirring until complete dissolution. At this point, the necessary amount of the wax was added, portion wise to dissolution under stirring. Likewise, the called amount of the polymer was added next to the hot mixture in small quantities until complete homogenization. The entire mix time required to prepare the batch was about one hour.

After the completion of preparation of the mixture, the mass was poured into a suitable container for later use.

EXAMPLES

The invention and its scope may best be understood from the following examples. In the examples the tested-for "properties" were determined by the following methods:

| Test Methods | |
|---|---|
| | ASTM Method |
| Cable Flooding Compounds | |
| Visc., Brookfield | D 3236 |
| R & B softening point | E 28 |
| Needle penetration | D 1321 |
| Drop melting point | D 127 |
| Congealing point | D 938 |
| Color | D 1500 |
| Density | D 792 |
| Slump characteristics (pie pan) | In-House (see below) |
| Cable Filling Compounds | |
| Visc., Brookfield | D 3236 |
| R & B softening point | E 28 |
| Cone penetration | D 217 |

| Test Methods -continued | |
|---|---|
| | ASTM Method |
| Drop melting point | D 127 |
| Congealing point | D 938 |
| Color | D 1500 |
| Density | D 792 |
| Slump characteristics (pie pan) | In-House (see below) |

Slump Characteristics

This test determines the flow-ability of the cable composition at a prescribed elevated temperature.

In an aluminum pan of 2.5" diameter and a depth of 0.5" is poured about 25–30 grams of melted sample and cooled to room temperature and aged overnight. The aluminum dish with the cast sample is then hung vertically in an oven maintained at the test temperature, i.e., 80° C. Periodic observation of the sample is made over a test period of two hours to see whether the sample had flowed or moved out of the pan indicating onset of fluidity. At the end of the test period if no dripping or movement is seen, the sample is classed as pass, otherwise a failure is recorded. Samples are run in duplicate and both must pass to record pass. The slump test can be run set to a given temperature. However, current requirement is that the cable composition exhibit no flow at least at 80° C.

Cable Floods

In Table I are shown various exemplary compositions demonstrating the utilization of byproduct HDPE wax in the preparation of cable flooding composition.

TABLE I

| WAX BASED CABLE FLOOD COMPOSITION | | | | | | | | |
|---|---|---|---|---|---|---|---|---|
| | 1 | 2 | 3 | 4 | 5 | 6 | 7 | 8 |
| Composition | | | | | | | | |
| Low Molecular Weight Polybutene | 100 | 97 | 88 | 88 | 85 | 88 | 88 | 85 |
| HDPE Wax[2] | - | - | 12 | 9 | 11 | 9 | 12.4 | 9 |
| LDPE Polymer (I)[3] | - | 3 | - | 3 | - | - | - | 3 |
| LDPE Polymer (II)[4] | - | - | - | - | 4 | 3 | - | - |
| Ethylene-Butene Copolymer | - | - | - | - | - | - | 2.6 | - |
| Amorphous Polyolefin (Propylene-Ethylene Copolymer)[6] | - | - | - | - | - | - | - | 3 |
| Wingstay SN-1[7] | - | 0.05 | 0.05 | 0.05 | 0.05 | 0.05 | 0.05 | 0.05 |
| Wingstay L-1[8] | - | 0.15 | 0.15 | 0.15 | 0.15 | 0.15 | 0.15 | 0.15 |
| Properties | | | | | | | | |
| Viscosity, cps at 300° F. (176.6° C.) | 425 | 475 | 240 | 270 | 285 | 280 | 290 | 300 |
| R & B Softening Point, °F. (°C.) | - (26.6) | <80 (113.3) | 236 (111.1) | 232 (106.6) | 224 (108.9) | 228 (113.9) | 237 (106.1) | 223 |
| Needle Penetration, dmm at 77° F. (°C.) | - | Soft | 82 | 90 | 95 | 113 | 82 | 97 |
| Slump Characteristics at 80° C. | Fail | Fail | Pass | Pass | Pass | Pass | Pass | Pass |

[1] Indopol H-1500, Amoco Chemical Co.
[2] Polyset 2025, IGI, Viscosity at 300° F. (176.6° C.) 20 cps–30 cps, R & B °F. (°C.) 240°F. (115.5)
[3] Low Density Polyethylene, M.I. 60 g/10 min., density 0.924 g/cc
[4] Low Density Poethylene, M.I. 20 g/10 min., density 0.917 g/cc
[5] Ethylene-Butene Copolymer, 15% Butene, M.I. 5.0 g/10 min., density 0.9 g/cc
[6] Amorphous Propylene Ethylene-Copolymer, Eastoflex P1060, Eastman Chemical Co.
[7] Antioxidant, Goodyear Chemicals
[8] Antioxidant, Goodyear Chemicals Example 1 of the table shows the property of a low molecular weight liquid polybutene, commercially available as Indopol H-1500 (Amoco Chemical Company). The inherent characteristics, especially poor flow resistance at 80° C., do not support the direct use of this material as a cable flooding agent. Modification of the liquid polybutene at a 3% level with low density polyethylene ("LDPE"), 0.924 g/cc density, 60 g/10 min. M.I. (Melt Index measures the flow property of polymer resin under prescribed test conditions (ASTM D1238) yielded a composition with elevation of viscosity, however with poor slump characteristics (Example 2.)

On the other hand, modification of the polybutene at 12% level with a byproduct HDPE wax, with characteristics of 30 cps viscosity at 300° F. (176.6° C.) and a R&B softening point of 240° F. (115.5° C.), produced a composition with desirable slump characteristics; however with inadequate viscosity (Example 3). Acceptable cable flood compositions should exhibit viscosity at 300° F. of from about 260 cps to about 330 cps, an R&B softening point of about 190° F. (87.8° C.) to 260° F. (126.6° C.) needle penetration (dmm at 77° F.) of about 60 to 120, as well as "pass" slump characteristics at 80° C., indicating adequate flow resistance.

In Example 4 is shown the use of the combination of the LDPE polymer and the HDPE wax, along with the liquid polybutene, to produce a composition in accordance with the present invention. The composition was judged acceptable with respect to meeting the desired application temperature viscosity, slump characteristics and other properties.

Example 5 shows a recipe based on the byproduct HDPE wax modified with a different LDPE polymer having the characteristics of 20 g/10 min M.I. and a 0.917 g/cc density. Again, the resulting cable flood composition was judged acceptable. Example 6 depicts a variation of the Example 5 recipe, utilizing the HDPE wax and LDPE polymer in different weight percentages, with acceptable results.

Example 7 shows the modification of the liquid polybutene with the HDPE wax of interest utilizing, instead of the LDPE type polymer, a partially crystalline copolymer of ethylene and butene, 85%/15% ratio, having a 5.0 g/10 min M.I., and a density of 0.9 g/cc. The resulting composition was deemed suitable as a cable flooding agent.

Example 8 is a variation of Example 4, wherein the preparation of the cable flood composition, starting with the liquid polybutene, was carried out utilizing the byproduct HDPE wax modified with the LDPE polymer of Example 4 and additionally with an equal amount of an amorphous polyolefin copolymer of propylene and ethylene. The composition of Example 8 was judged somewhat superior to that of the Example 4 composition.

The examples recited show the various possibilities of upgrading the byproduct wax via modification with other types of polymers directly into the liquid polybutene to yield finished products suitable for use as cable flooding agents. Alternatively, the HDPE wax can be premixed with the appropriate polymer or polymer combination to provide a wax concentrate, which can later be let down or solvated in the liquid polybutene, or other carrier, to yield the desired composition. The preferred approach will be dictated by factors such as ease of manufacturing, economics, etc. Either approach may be used within the scope and spirit of the invention.

Cable Fills

Examples of the utilization of the byproduct HDPE wax in cable filling compositions are shown in Table II.

TABLE II

| WAX BASED CABLE FILLING COMPOSITION | | | | | |
|---|---|---|---|---|---|
| | 1 | 2 | 3 | 4 | 5 |
| Composition | | | | | |
| Mineral Oil[1] | 95 | 83.5 | 88.5 | 92.5 | 83.5 |
| S-EB-S Block Copolymer | 5 | 5 | - | 5 | 5 |
| HDPE Wax[3] | - | 11.5 | 9 | - | 9 |
| Ethylene-Hexene Copolymer[4] | - | - | 2.5 | 2.5 | 2.5 |
| Irganox 1010[5] | 0.2 | 0.2 | 0.2 | 0.2 | 0.2 |
| Properties | | | | | |
| Viscosity, cps at 266°F.(130° C.) | 25 | 30 | 10 | 40 | 40 |
| R & B softening Point, °F.(°C.) | 103 | 152 | 120 | 130 | 177 |
| | (39.4) | (66.6) | (48.9) | (54.4) | (80.5) |
| Drop Melt Point, °F. (°C.) | 121 | 201 | 201 | 196 | 217 |
| | (49.4) | (93.9) | (93.9) | (91.1) | (102.8) |
| Cone Penetration @ 77° F. (25° C.) | 205 | 102 | >200 | 195 | 65 |
| Slump Characteristics @ 80° C. | Fail | Fail | Fail | Fail | Pass |

[1]Drakeol 35, Penreco, Viscosity Centistokes at 40° C. 68, Specific Gravity 0.864 at 25° C.
[2]Kraton G 1652, Shell Chemical Co.
[3]Polyset 2025, IGI, Viscosity, 30 cps at 300° F. (148.9° C.), R & B °F. (°C.) 246° F. (115.5)
[4]Ethylene-hexene copolymer, 6% Hexene, Density, 0.931, M.I. 145 g/10 min.
[5]Antioxidant, Ciba Geigy In cable filling as well, the requirement for the composition to resist flow at 80° C. is important, along with sufficient low viscosity at application temperature and attainment of a gelled-like structure at room temperature. The preferred criteria are viscosity at 266° F. of 25 cps to 60 cps, R&B softening point of 170° F. (76.6° C.) to 215° F. (101.6° C.), a drop melt point of 194° F. (90° C.) to 220° F. (104.4° C.), cone penetration dmm at 77° F. of 50° to 130° and adequate flow resistance at 800° C. to "pass" the slump characteristics test.

A low viscosity mineral oil is the preferred carrier medium for the production of cable filling compounds. As noted earlier, the use of a block copolymer as a gelling medium is known. However, by itself the block copolymer will not provide sufficient elevated temperature slump resistance, as seen from Example 1 of Table II. Modification of the mineral oil with the byproduct wax along with block copolymer also does not produce a product with adequate slump characteristics. Example 2, Table II.

Combination of the HDPE wax with an ethylene-hexene copolymer (hexene content 5%–7% by weight, a 145 g/10 min M.I., and a density of 0.931 g/cc) as shown in Example 3, but without the presence of the block copolymer also failed to provide the desired product. Likewise the composition of Example 4, wherein the wax was excluded from the composition, did not provide the desired composition.

Exemplary composition 5, which shows a mineral oil-based recipe, including the block copolymer, the HDPE byproduct wax with the supplemental modification with an ethylene-hexene copolymer results in the desired composition showing among other desirable properties, adequate slump characteristics at 80° C.

Again, it would be feasible to prepare the modified HDPE wax separately, by incorporating therein the block copolymer and the ethylene-hexene copolymer, for later mixing with the mineral oil to achieve the same end objective of obtaining a finished cable fill composition. In both instances, the art of modification of the byproduct HDPE wax for preparation of either the cable filling or the cable flooding composition, can deviate from the specific cited examples to arrive at the desired composition with desired properties, but within the scope of the claimed invention.

The foregoing disclosure and description of the invention are illustrative only, and various changes may be made in the materials, ingredients, compositions and methods of formulation, within the scope of the disclosure, without departing from the spirit of the invention.

What is claimed is:

1. A modified wax composition comprising:

from about 45 to about 98 weight percent high density polyethylene wax ("HDPE wax");

from about 2 to about 50 weight percent of an ethylene polymer selected from the group consisting of homopolymers and partially crystalline copolymers of ethylene and an alphaolefin selected from the group consisting of 1-butene, 1-hexene, 1-octene and 1-decene; and from about 0 to about 50 weight percent of a substantially amorphous homopolymer or copolymer of polypropylene, said HDPE wax having a density of from about 0.93 to about 0.96 g/cm$^3$, a number average molecular weight ("Mn") of from 500 to 3,000 and a melt viscosity at 300° F. of from 5 centipoise to 500 centipoise, and said ethylene polymer having a density of from 0.88 to 0.93 g/cm$^3$ and a number average molecular weight ("Mn") of from 10,000 to 100,000, said modified wax composition being noncross-linked and being suitable for use in the preparation of cable fill and flood compounds.

2. The composition according to claim 1 comprising additionally from about 0.02 to about 5 weight percent of an antioxidant.

3. A composition comprising an admixture of:

a first component comprising, from about 45 to about 98 weight percent HDPE wax, from about 2 to about 50 weight percent of an ethylene polymer selected from the group consisting of homopolymers and partially crystalline copolymers of ethylene and an alphaolefin selected from the group consisting of 1-butene, 1-hexene, 1-octene and 1-decene, and from about 0 to about 50 weight percent of a substantially amorphous homopolymer or copolymer of polypropylene; and a second component selected from the group consisting of mineral oil, liquid polybutene, polymerized alphaolefin, process oil and petrolatum, said HDPE wax having a density of from about 0.93 to about 0.96 g/cm$^3$, a number average molecular weight ("Mn") of from 500 to 3,000 and a melt viscosity at 300° F. of from 5 centipoise to 500 centipoise, and said ethylene polymer having a density of from 0.88 to 0.93 g/cm$^3$ and a number average molecular weight ("Mn") of from 10,000 to 100,000, said composition being noncross-linked and being suitable for use as a cable fill or flood, said HDPE wax comprising from about 7 to about 15 weight percent of said composition; said homopolymer or copolymer of ethylene comprising from about 0.5 to about 10 weight percent of said composition and said second component comprising from about 75 to about 90 weight percent of said composition.

4. The composition according to claim 3, comprising additionally a block copolymer selected from the group consisting of styrene-ethylene/butene-styrene and styrene-ethylene/polypropylene-styrene.

5. The composition according to claim 4, wherein said block copolymer comprises from about 4 to about 10 weight percent of said composition.

* * * * *